United States Patent
Shi et al.

(10) Patent No.: US 6,201,890 B1
(45) Date of Patent: Mar. 13, 2001

(54) DIGITAL-TO-FILM RADIOGRAPHIC IMAGE CONVERSION

(75) Inventors: Shuanghe Shi, Mequan; James Martin Hill; Kenneth Scott Kump, both of Waukesha, all of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/224,240

(22) Filed: Dec. 30, 1998

(51) Int. Cl.[7] .................................................. G06K 9/00
(52) U.S. Cl. ................................................... 382/132
(58) Field of Search .................................. 382/132, 190, 382/192, 194, 269, 275, 286, 305, 312; 348/77, 332, 571, 572, 573, 720; 378/21, 22, 23, 162, 165, 167, 189; 250/580, 591, 328, 330, 332, 559.04, 559.05, 492.1

(56) References Cited

U.S. PATENT DOCUMENTS

| | | | |
|---|---|---|---|
| 4,939,667 | * 7/1990 | Hara et al. | 702/32 |
| 5,015,853 | * 5/1991 | Nakajima | 250/587 |
| 5,220,357 | * 6/1993 | Kubo et al. | 347/112 |
| 5,371,562 | * 12/1994 | Hahm et al. | 396/324 |
| 5,483,259 | * 1/1996 | Sachs | 345/153 |
| 5,522,067 | * 5/1996 | Swire | 707/204 |
| 5,691,961 | * 11/1997 | Paranjpe | 347/217 |
| 5,786,902 | * 7/1998 | Morton | 358/475 |
| 5,927,191 | * 7/1999 | Wheatley, Jr. et al. | 101/128.4 |
| 5,966,503 | * 10/1999 | van Vliembergen et al. | 358/1.6 |
| 5,987,270 | * 11/1999 | Hulan et al. | 399/45 |
| 5,994,711 | * 11/1999 | Seachman et al. | 250/559.36 |
| 6,071,855 | * 6/2000 | Patton et al. | 503/227 |

\* cited by examiner

Primary Examiner—Andrew W. Johns
Assistant Examiner—Shervin Nakhjavan

(74) *Attorney, Agent, or Firm*—Craig A. Fieschko, Esq.; Phyllis Y. Price; Jay L. Chaskin

(57) ABSTRACT

A method for converting a digital image to an analog-simulative film-like digital image is described wherein input pixel values (designated X) from the original digital image are converted to film-like output values (designated Y) wherein $Y=AX^P+B$. The input values X, which range from $X_{min}$ to $X_{max}$, are divided into consecutive intervals wherein different values of A, p, and B are applied for each interval. Most preferably, three intervals are defined so as to correspond to low, medium, and high light/radiation response intervals on film. In a low light/radiation region wherein $X<X_1$, A is generally chosen to be less than 1 to provide range compression at the low end of the input dynamic range, and p is generally chosen to be greater than 1 to provide increasing light response. In a high light/radiation region wherein $X>X_2$, p is generally chosen to be less than 1 to provide range compression. In the intermediate medium light/radiation region, p is preferably chosen to be approximately 1 to provide a response which is linear with respect to the input, but A is preferably chosen to be greater than 1 to provide range expansion. An image formed in accordance with the resulting output values Y provides an exceedingly good representation of a filmed radiographic image, and may be printed on translucent film for use and analysis in the same manner as a filmed radiographic image produced by analog methods. Additionally, the output values Y can be made to even more accurately mimic the response of film if the aforementioned conversion is expanded in accordance with $$Y = \sum_{i=1}^{M} A_i X^{p_i} + B_i$$

wherein M is an integer value greater than 1.

20 Claims, 1 Drawing Sheet

Film Like Look-up Table

DIGITAL-TO-FILM RADIOGRAPHIC IMAGE CONVERSION

FIELD OF THE INVENTION

This disclosure concerns an invention relating generally to radiographic imaging, and more specifically to conversion of digital radiographic images to images printed on film-like material which are simulative of analog radiographic images.

BACKGROUND OF THE INVENTION

The classic radiographic or "X-ray" image is obtained by situating the object to be imaged between an X-ray emitter and an X-ray detector made of photographic film. Emitted X-rays pass through the object to expose the film, with the degree of film exposure at the various points on the film largely being determined by the attenuation of the object along the path of the X-rays.

It is proposed to utilize solid-state digital X-ray detectors, e.g., an array of photodiodes, in place of film detectors. After the X-ray exposure is terminated, the charges generated on the various points of the detector are read and processed to generate a digital image of the object in electronic form, rather than an analog image on photographic film. Digital imaging is advantageous because the image can later be electronically transmitted to other locations, subjected to diagnostic algorithms to determine properties of the object, and so on.

However, digital images present problems when printed for analysis by radiologists. Because the characteristics of the digital detectors are significantly different from those of film, the images look quite different from analog film images, even when printed on transparent film. This is due to the differing exposure response curves of digital and film detectors. As an example, the digital image data generated by a detector may be linearly proportional to the received radiation (or nearly so), whereas film has a non-linear response to radiation. As a result, the contrast in digital images is not as great as that with radiographic film. To avoid error, radiologists analyzing digital images must keep these differences between analog and digital X-ray images prominently in mind when making such analyses. Therefore, there has been a need for a means of "translating" digital images into analog-simulative digital images which mimic the results of standard prior filmed images, and which may be printed on transparent film so that they resemble filmed radiographic images. This would allow the use of light boxes and other tools commonly in use for analysis of analog filmed images.

SUMMARY OF THE INVENTION

The invention, which is defined by the claims set out at the end of this disclosure, is directed to a method for converting a digital image to an analog-simulative film-like digital image. Input pixel values from the original digital image are obtained, wherein these input values (designated X) have a dynamic range extending from $X_{min}$ to $X_{max}$. The dynamic range is divided into an integer number of intervals N which is equal to at least 2. In each interval, the input value X for each pixel is converted into an analog-simulative film-like output value $Y=\Sigma(A_i X^{pi}+B_i)$, where $\Sigma$ signifies a summation wherein i ranges from 1 to M, $A_i$, pi, and $B_i$ are real numbers, and each interval generally has different values of $A_i$, pi, and $B_i$. This can be reexpressed as $$Y = \sum_{i=1}^{M} A_i X^{pi} + B_i$$

$$= A_1 X^{p1} + B_1 + A_2 X^{p2} + B_2 + \ldots + A_i X^{pi} +$$

$$B_i + \ldots + A_M X^{pM} + B_M$$

$$= A_1 X^{p1} + A_2 X^{p2} + \ldots + A_i X^{pi} + \ldots + A_M X^{pM} + B$$

wherein this conversion is applied to each of the N intervals, and wherein each interval generally has different values of $A_i$, pi, and $B_i$.

In the most preferred embodiment of the invention, it has been found sufficient to have M=1. In this case, the foregoing expression simplifies to $$Y = AX^p + B$$

wherein this conversion is applied to each of the N intervals (again, with each interval usually having different values of A, p, and B). It has also been found suitable to set N=3, thereby defining three intervals representing low, medium, and high radiation/light response intervals wherein the low radiation/light interval is defined at input values $X<X_1$, the high light/radiation interval is defined at $X>X_2$ (with $X_2>X_1$), and the medium light/radiation interval is defined therebetween. The values of $X_1$ and $X_2$ are chosen such that the low and high light/radiation intervals cover some desired portion of the low and high ends of the input dynamic range, e.g., the lower and upper 30% of the input dynamic range. In the high, medium, and low light intervals, the parameters A, p, and B preferably have the following behavior.

First, p will generally be greater than 1 for intervals on the low end of the dynamic range and less than 1 for intervals on the high end of the dynamic range, with p decreasing in each successive interval after the first. Further, where one or more medium radiation/light response intervals are defined, p will generally be approximately 1 in these intervals so as to provide an output response which is approximately linear with respect to the input. However, these medium radiation/ light response intervals will generally have A greater than 1 so as to amplify the input, thereby providing greater contrast in the medium interval.

Second, A will generally increase in each successive interval after the first, and will generally be less than 1 in the first interval to better suppress quantum noise at the low end of the dynamic range.

Finally, B will be chosen so as to provide continuity between intervals, and to also provide a desired level of optical density (i.e., lightness/darkness) at chosen points along the output dynamic range.

After the output pixel values Y are determined for each pixel in the digital input image, these are compiled to generate an output analog-simulative film-like digital image. This may be displayed on a screen, printed on translucent film-like media for use in the same manner as an analog (filmed) image, or otherwise used in a desired manner.

While the preferred embodiment of the invention utilizes M=1 and N=3, it is noted that higher values of M and N can be used to more accurately simulate the nonlinear response of film. However, since the conversion is preferably automated in software or hardware form, higher M and N will generally lead to increased processing requirements and longer processing times. As a result, in view of the present state of the art, M=1 and N=3 are regarded as providing a suitable exchange between accuracy and processing time.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
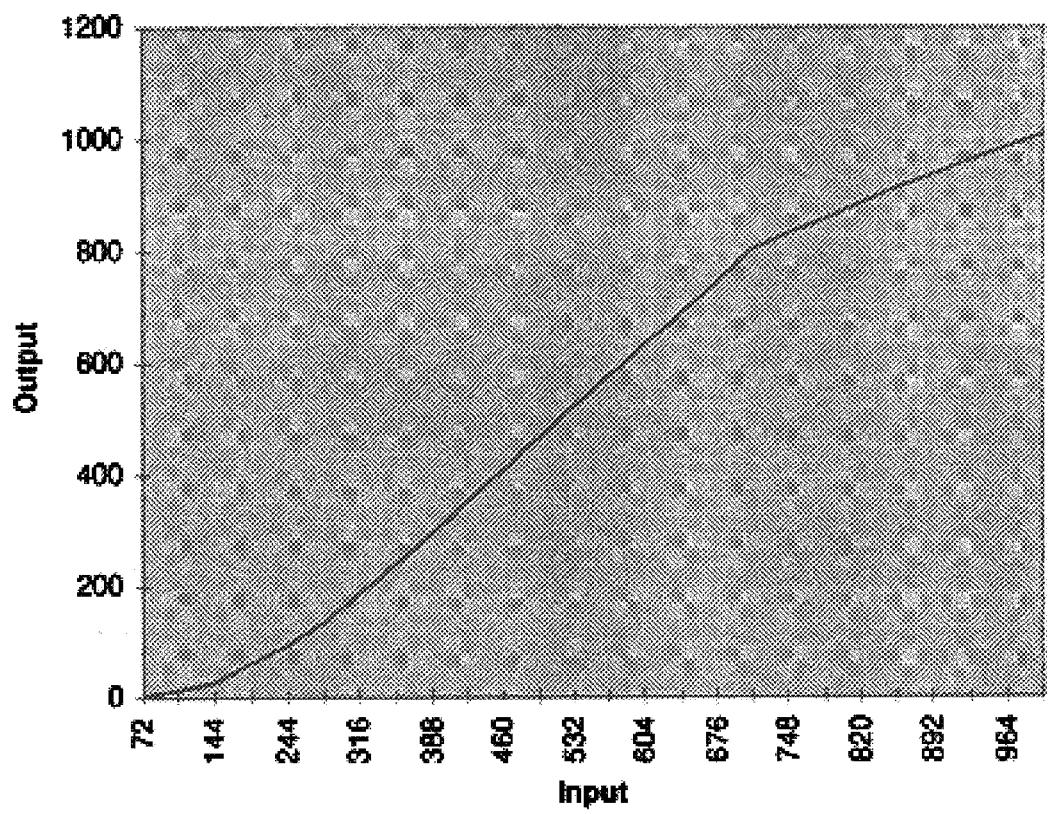
FIG. 1 is a graph of LSB (Least Significant Bit) values for pixels in an input digital image versus LSB values for an output analog-simulative film-like digital image in accordance with the invention.

As noted above, the invention involves a method of converting digital images acquired from a radiographic detector into a digital form which simulates an analog film image. In the preferred embodiment of the method, the value of each pixel within the digital image—which is received as an input from a corresponding photodiode (or other sensor) in the detector—is converted to an output analog-simulative value depending on its LSB (Least Significant Bit) value (grey level) within the dynamic range of the input radiographic image (i.e., the range of gradation of tones between lightest to darkest). The conversion, which is preferably provided by the processor receiving the pixel data from the detector, takes the following form:

$$Y = \sum_{i=1}^{M} A_i X^{p_i} + B_i$$

wherein

Y is the output analog-simulative value of the pixel,

X is the input digital pixel value (a grey level within the input dynamic range), M is an integer number greater than or equal to 1, and $A_i$, pi, and $B_i$ are appropriate real-number constants.

As will be discussed at greater length below, when performing the conversion, the dynamic range of the input digital image is preferably divided into N regions (N being an integer which is preferably greater than 1). A different conversion (i.e., different values for the constants $A_i$, pi, and $B_i$) is then preferably applied to each region.

Regarding the values of $A_i$, pi, and $B_i$, these are determined by simply choosing their values so that a desired response curve is obtained. If desired, regression techniques can be applied to experimental data to obtain $A_i$, pi, and $B_i$ values. It is noted that since the output may be viewed on different output devices, different values of $A_i$, pi, and $B_i$ may be appropriate for different versions of the invention using different types of output devices in order to obtain a more suitable analog-simulative output. As an example, one may expect that for two radiographic imaging systems which are equivalent save for their image output devices (e.g., the output devices have different output bit depths), $A_i$, pi, and $B_i$ will differ between the two systems.

Since the conversion is to mimic the nonlinear response curve of film, it can be expected that greater values of M will allow the conversion to more accurately match this response. However, greater values of M will also increase the computational burden of the conversion, and thus there is a tradeoff between enhanced output and processing times. In view of current processor speeds, the conversion has been found to yield entirely suitable results when M=1, that is, when the conversion is simplified to $$Y = AX^p + B$$

for each of the N regions. However, while the most preferred embodiment of the invention at present has M=1, as processor speeds increase in the future, it can be expected that it may become desirable to increase M and gain a more accurate film-simulative response.

Similarly, it has also been found suitable to use N=3, thereby defining three regions across the input dynamic range wherein the conversion is to be applied. The following equations describe the three regions (wherein reference is made to the corresponding FIG. 1 of the drawings):

Initially, a low light/radiation region (which corresponds to low light values such as those of bones in a chest image) is defined. It has been found that a generally good definition of the low light region is provided by $X < X_1$ where $X_1 = Q_1\% (X_{max} - X_{min})$ and $Q_1 = 30$ In other words, the low light region is defined as the lower 30% of the input dynamic range. The conversion is then applied by:

$$Y = A_1 X^{p_1} + B_1$$

and for image output devices having an output bit depth of 10 bits, $A_1$, p1, and $B_1$ have the following values:

$A_1 = 0.000103$ $B_1 = 0.0$ p1 = 2.5

In the low light region, the low light response curve of film is simulated by applying range compression (as effected by the small value of $A_1$, evidenced in FIG. 1 by the low responsiveness of the output values with respect to changes in the input values), but by also providing increasing responsiveness to increasing light levels (as effected by the value of p1 greater than 1). Apart from providing an accurate simulation of the low light response of film, the conversion also suppresses low-level quantum and electronic noise present in the input by attenuating the input at extremely low light levels.

A high light/radiation region (which corresponds to high light values such as those of the skin line in a chest image) may then be defined at the upper end of the input dynamic range. A generally good definition of the high light region is provided by $X > X_2$ where $X_2 = Q_2\% (X_{max} - X_{min})$ and $Q_2 = 70$ In other words, the high light region is defined as the upper 30% (or 100%–70%) of the input dynamic range. For image output devices having an output depth of 10 bits, the conversion is then applied by:

$$Y = A_3 X^{p_3} + B_3$$

where
- $A_3=41$
- $B_3=-287$
- $p3=0.5$

The high light response curve of film is simulated by applying range compression in the form of p3<1, thereby providing decreased output response to increasing input values.

The middle light/radiation region corresponds to medium light values such as those of organs and vessels in a chest image. For 10-bit output devices, the conversion in the middle light region, which is applied to input values $X_1<X<X_2$ (i.e., in the middle 40% of the dynamic range where the upper and lower regions are respectively set to the upper and lower 30% of the range), is expressed by $$Y=A_2 X^{p2}+B_2$$

where
- $A_2=1.56$
- $B_2=-308$
- $p2=1$

By setting p2=1, the conversion for the middle light region is a linear one wherein $Y=A_2X+B_2$. Amplification/range expansion is provided by setting the slope $A_2>1$, thereby enhancing the contrast of the middle light region.

The values for the A, B, and p parameters, as well as for the $Q_1$ and $Q_2$ boundary values, may vary to some degree from those stated above. In the low light region, which will generally be defined with $5 \leq Q_1 \leq 40$ (i.e., the low light region will generally be defined at the lower 5%–40% of the input dynamic range), it will usually be desirable to apply range compression in the form of $A_1<1$ (and generally $A_1<<1$), and to also apply increasing responsiveness to increasing light levels by setting p1>1. The low light response region will thus provide the upwardly-sloping tail to the output/input curve shown in FIG. 1. In the middle light region, it will generally be desirable to provide approximately linear responsiveness by setting p2≈1, but to also provide range expansion by setting $A_2>1$. As for the high light region, it will generally be defined at the upper 60%–95% of the input dynamic range (i.e., $60 \leq Q_2 \leq 95$), and will provide a tail with decreasing slope such as that shown in FIG. 1. Conversely with the low light region, the parameters of the high light region are desirably set at $A_3>1$ (and generally $A_1>>1$), and p3<1.

It is notable that in the analog-simulative film-like output digital image, the optical density of the film-like image—the log base 10 ratio of the incident light intensity over the transmitted light density, a measure of the opacity of a transparent medium—may be set as desired at selected points on the dynamic range by choosing appropriate values for A, B, and p. This is most easily done by choice of an appropriate B value. Recommended optical density values at $X_1$ and $X_2$ to provide a high-quality film-like image are respectively 0.5 and 2.3, though variations from these values by as much as ±75% will still provide adequate results. It is also notable that the B values are preferably chosen such that the output curve is continuous between the N intervals.

As noted above, different output devices may require different A, p, and B values depending on their output bit depths. Stated more generally, when applying the conversions, the overall transfer function between the detector and the image display device (i.e., the monitor, printer, or other device used to view the analog-simulative film-like image) must be kept in mind; if an intermediate component applies some form of amplification or attenuation, the A, B, and p values may require modification to provide the desired conversion between the input detector image values and the output analog-simulative film-like image values.

It is understood that preferred embodiments of the invention have been described above in order to illustrate how to make and use the invention. The invention is not intended to be limited to these embodiments, but rather is intended to be limited only by the claims set out below. Thus, the invention encompasses all alternate embodiments that fall literally or equivalently within the scope of these claims.

What is claimed is:

1. A method for converting a digital image to an analog-simulative film-like digital image comprising:

a. obtaining digital image input values for a number of pixels, each pixel having a digital image input value X, wherein the range of input values for all pixels defines the input dynamic range;

b. for each pixel, determining an analog-simulative film-like output value $$Y = \sum_{i=1}^{M} A_i X^{p_i} + B_i$$

wherein
   $A_i$, pi, and $B_i$ are real numbers, and
   M is an integer value greater than or equal to 1; and c. printing an image on translucent film in accordance with the output values of the pixels.

2. The method of claim 1 wherein the step of determining an analog-simulative film-like output value Y includes:

a. for pixels having input values $X<X_1$ wherein $X_1$ is a value within the input dynamic range, determining for each pixel an analog-simulative film-like output value $$Y = \sum_{i=1}^{M} A_{1i} X^{p_{1i}} + B_{1i}$$

wherein
   $A_{1i}$, $p_{1i}$, and $B_{1i}$ are real numbers,
   M is an integer number greater than or equal to 1, and
   $p_{1i}>1$, b. for pixels having input values $X>X_2$ wherein $X_2$ is a value within the input dynamic range and $X_2 \geq > X_1$, determining for each pixel an analog-simulative film-like output value $$Y = \sum_{i=1}^{M} A_{3i} X^{p_{3i}} + B_{3i}$$

wherein
   $A_{3i}$, $p_{3i}$, and $B_{3i}$ are real numbers,
   M is an integer number greater than or equal to 1, and
   $p_{3i}<1$.

3. The method of claim 2 wherein $A_{1i} < 1$.

4. The method of claim 2 wherein $A_{3i} > 1$.

5. The method of claim 2 wherein $X_2 > X_1$, and further comprising the step, for pixels having input values $X_1 \leq X \leq X_2$, of determining for each pixel an analog-simulative film-like output value $$Y = \sum_{i=1}^{M} A_{2i} X^{p_{2i}} + B_{2i}$$

wherein $A_{2i}$, $p_{2i}$, and $B_{2i}$ are real numbers,

M is an integer number greater than or equal to 1, and $p_{2i} \approx 1$.

6. The method of claim 5 wherein $A_{2i} > 1$.

7. The method of claim 6 wherein $A_{1i} < 1$.

8. The method of claim 6 wherein $A_{3i} > 1$.

9. A method for converting a digital image to an analog-simulative film-like digital image comprising:
   a. obtaining digital image input values from a number of pixels, each pixel having an input value X, wherein the range of input values for all pixels defines the input dynamic range;
   b. for pixels having input values $X < X_1$ wherein $X_1$ is a value within the input dynamic range, determining for each pixel an analog-simulative film-like output value $Y = A_1 X^{p1} + B_1$ wherein $A_1$, p1, and $B_1$ are real numbers and p1>1,
   c. for pixels having input values $X > X_2$ wherein $X_2$ is a value within the input dynamic range and $X_2 \geq X_1$, determining for each pixel an analog-simulative film-like output value $Y = A_3 X^{p3} + B_3$ wherein $A_3$, p3, and $B_3$ are real numbers and p3<1,
   d. generating an output image in accordance with the output values of the pixels.

10. The method of claim 9 wherein $A_1 < 1$ and $A_3 > 1$.

11. The method of claim 9 further comprising the step of printing the output image on translucent film.

12. The method of claim 9 wherein $X_2 > X_1$, and further comprising the step, for pixels having input values $X_1 \leq X \leq X_2$, of determining for each pixel an analog-simulative film-like output value $Y = A_2 X^{p2} + B_2$ wherein $A_2$, p2, and $B_2$ are real numbers and $p2 \approx 1$.

13. The method of claim 12 wherein $A_2 > 1$.

14. The method of claim 13 wherein $A_1 < 1$ and $A_3 > 1$.

15. A method for converting a digital image to an analog-simulative film-like digital image comprising:
   a. obtaining digital image input values from a number of pixels, each pixel having an input value X ranging between $X_{min}$ and $X_{max}$, the range between $X_{min}$ and $X_{max}$ defining the dynamic range of the input values;
   b. dividing the dynamic range into N intervals, N being an integer number of at least 1;
   c. for each interval, determining for each input value therein an analog-simulative film-like output value $$Y = \sum_{i=1}^{M} A_i X^{p_i} + B_i$$

wherein

M is an integer value greater than or equal to 1,

X is the input value, $A_i$, $p_i$, and $B_i$ are real numbers, and $p_i$ decreases with each interval after a first interval adjacent $X_{min}$; and d. generating an output image in accordance with the output values of the pixels.

16. The method of claim 15 wherein the $B_i$ term(s) are chosen to provide a continuous curve for Y as X varies across the N intervals.

17. The method of claim 15 further comprising the step of printing the output image on translucent film.

18. The method of claim 15 wherein:
   a. $p_i > 1$ for at least one interval close to $X_{min}$, and
   b. $p_i < 1$ for at least one interval close to $X_{max}$.

19. The method of claim 18 wherein $N \geq 3$, and wherein $p_i \approx 1$ for at least one interval between $X_{min}$ and $X_{max}$.

20. The method of claim 15 wherein $N \geq 3$, and wherein $A_i > 1$ for at least one interval between a first interval adjacent $X_{min}$ and a last interval adjacent $X_{max}$.

* * * * *